United States Patent Office 3,330,702
Patented July 11, 1967

3,330,702
BATTERY SEPARATOR
Carl Horowitz, Brooklyn, N.Y., assignor to Yardney International Corp., New York, N.Y., a corporation of New York
No Drawing. Filed Mar. 20, 1962, Ser. No. 181,187
1 Claim. (Cl. 136—146)

The present invention relates to separators for electric batteries and more particularly to separator for alkaline batteries. It has particular application to silver-oxide/zinc alkaline batteries.

The separators employed in batteries of this type depend for their utility either on the inherent properties of the materials per se or on coatings applied to the base material. In the first case, only a small number of chemical entities meet the requirements for a battery separator such as inertness to the surroundings, good wettability by the electrolyte and ionic conductance. In the second case, the coatings tend to separate from the separator backing, leaving the latter exposed to the corrosive conditions in the battery.

It has now been found that active side chains or groups can be chemically attached or grafted to the existing inert backbone films or fabrics which do not peel or break off. Starting with a backbone of an existing polymeric fabric which has no polar groups, side groups rich in polar groups may be grafted thereto. Conversely, starting with a polymeric fabric or film which has polar groups, a nonpolar side chain may be attached for added chemical protection. The groups grafted on may be nonionic (for protection only), cationic to prevent positive ions from going through the separator fabric or anionic to prevent negative ions from going through the same.

It is accordingly an object of the present invention to provide a battery separator of polymeric fabric or film material having chemically bound to or grafted onto the polymeric backbone thereof, chemical groups which modify the original characteristics of the fabric or film to make it more suitable for use as a battery separator.

It is also an object of this invention to provide a process for making such a separator.

It is a further object of this invention to provide a battery having said separator incorporated therein.

Other and more detailed objects of this invention will be apparent from the following description and claims.

In the prior art, it has been suggested that unsaturated compounds may be grafted onto polymeric backbones by means of irradiation from radioactive material. This method, however, suffers from many drawbacks. It requires elaborate safety equipment and is not suitable for large-size production. Moreover, it weakens the backbone polymer.

In accordance with the present invention, the grafting procedure utilizes an existing polymeric film, preferably cellophane. However, many other polymers can be used such as polyvinyl alcohol, polystyrene, nylon or polypropylene.

The materials grafted onto the polymeric backbone are vinyl monomers such as acrylic acid, methacrylic acid, vinyl pyrrolidone, hydroxyethylmethacrylate, glycidylmethacrylate, sodium styrene sulfonate, vinyl chloride, vinyl acetate, styrene, alpha methyl styrene, vinylidene chloride, acrylonitrile, methylmethacrylate, ethylmethacrylate, hydroxypropylmethacrylate, dimethylaminoethylmethacrylate. The preferred monomers are glycidylmethacrylate and sodium styrene sulfonate separately or cografted together.

The catalyst employed in grafting and subsequent polymerization, in accordance with this invention, may vary. By way of illustration, the groups of peroxides or azo compounds or metallic redox catalysts may be mentioned. Examples of these are benzoyl peroxide, methylethylketone peroxide, hydrogen peroxide, cumene hydroperoxide, tert-butyl-hydroperoxide, ammoniumpersulfate, hydrogen peroxide, azobisisobutyronitrile and ceric sulfate. Preferred among these are ammoniumpersulfate azobisisobutyronitrile and ceric sulfate.

An initiator may be used, if it is desired, to carry out the reaction at room temperature. The following reducing compounds are suitable initiators: trimethanolamine, dimethyl aniline, sodium metabisulfite, sodium sulfite and ferrous ammonium sulfite.

The treating agent of this invention is employed in the form of a solution. The selection of a solvent is important. The polymeric film backbone has to be wetted and penetrated by the solvent. At the same time the monomer has to be dissolved in this solvent. Because of these facts it is sometimes necessary to utilize a mixture of solvents. Cellophane, for example, is swelled by water or aqueous solutions. On the other hand many monomers such as glycidylmethacrylate or styrene are not soluble in water but they are soluble in dioxane, dimethyl formamide or any water-miscible solvent. In this event the solvent system comprises a mixed solvent. Other solvents which may be employed also include tetrahydrofurfuryl alcohol, methyl alcohol, ethyl alcohol, isopropyl alcohol, etc.

The temperature used in the process employed in accordance with this invention can vary from room temperature to the boiling point of the treating solution. The lower temperatures are more suitable when initiators are employed.

In accordance with the present invention, an improved battery separator results which, when used e.g. in an alkaline (e.g. 44% aqueous KOH) silver-oxide/zinc battery as a wrapper around the electrodes, gives a cycle life of at least twice that of the existing batteries without adversely affecting the performance of these batteries.

Typical systems wherein the grafted separators of the present invention may be employed are illustrated in U.S. Patents 2,594,709; 2,594,710; 2,594,711; 2,594,712; 2,610,219; 2,635,127; 2,851,509 and 2,872,362. In these cases the separator made by the process described in Example 1, below, may be used in place of the cellophane employed in the specific embodiments of these patents.

The following examples are further illustrative of the present invention. It is to be understood, however, that the invention is not limited thereto.

EXAMPLE 1

Dioxane _____ grams__ 360
Glycidylmethacrylate _____ do____ 120
Water _____ cc___ 150
Lauroyl peroxide _____ grams__ 1.8

A piece of cellophane was immersed to saturation in the above solution heated to 60° C. and kept there for 1 hour. It was then washed with acetone and ethyl acetate.

Initial thickness of cellophane _____ .001"
Thickness of grafted cellophane _____ .0014"
Ohmic resistance of cellophane in
  44% KOH _____ .011 ohm x in.$^2$
Ohmic resistance of grafted cellophane in
  44% KOH _____ .028 ohm x in.$^2$ The above separator when used in an alkaline (e.g. 44% KOH) silver-oxide zinc battery gave cycle life twice as long as a normal separator used up till now.

EXAMPLE 2

Dioxane _____ grams__ 360
Glycidylmethacrylate _____ do___ 120
Water _____ cc.___ 150
Azoisobutyronitrile _____ grams__ 1.8

A sample of cellophane was immersed to saturation in the above solution heated to 60° C. on water bath for 1 hour and then washed with acetone and ethyl acetate. Final thickness of the grafted material was 0.0016", ohmic resistance .047 ohm x in.$^2$ in 44% KOH.

EXAMPLE 3

| | | |
|---|---|---|
| Dioxane | grams | 180 |
| Tetrahydrofurfuryl alcohol | do | 180 |
| Glycidylmethacrylate | do | 120 |
| Water | cc. | 150 |
| Azoisobutyronitrile | grams | 2.4 |
| Triethanolamine | do | 4.8 |

A sample of cellophane was immersed to saturation in the above solution and maintained at room temperature for 2 hours; then washed with water and ethyl acetate. Thickness of final grafted film=.0013", resistance in 44% KOH=.28 ohm x in.$^2$.

EXAMPLE 4

A solution (A) consisting of 7 grams ceric sulfate, 18 grams concentrated nitric acid and 200 cc. distilled water is prepared.

A piece of cellophane is placed in a tray containing 200 ml. of vinyl pyrrolidone monomer. Solution (A) is added to that solution in two portions in a period of one hour. The cellophane sample is left in that solution for an additional hour. The cellophane is taken out and washed with acetone, with dimethyl formamide and finally with methanol. The sample is found to have increased in thickness 20% and in weight 20%. When placed in an apparatus for accelerated penetration test by zinc the sample resists growth of zinc through it. Its electrical resistance is the same as that of the cellophane.

EXAMPLE 5

The procedure of Example 4 was repeated except that methacrylic acid was used in place of vinyl pyrrolidone monomer. One hundred percent increase in thickness and weight was obtained.

EXAMPLE 6

The procedure of Example 4 was repeated except that acrylonitrile monomer was used in place of the vinyl pyrrolidone monomer.

By the process of Examples 4, 5 and 6, above, long side chains of vinyl polymers are attached to cellulose, giving it protection against penetration by zinc during the charging process in alkaline silver-oxide/zinc batteries. Also in cases when polar groups are present on the vinyl side chain (methacrylic acid, polyvinyl pyrrolidone) additional benefits of ion exchange properties are obtained.

EXAMPLE 7

| | | |
|---|---|---|
| Sodium styrene sulfonate | grams | 20 |
| Glycidylmethacrylate | do | 30 |
| Water | cc. | 50 |
| Dioxane | grams | 100 |
| Ammonium persulfate | do | .5 |

Cellophane is placed in the above solution for 1 hour on water bath, washed with water and dried. Thickness of final grafted film is .002"; ohmic resistance is .016 ohm x in.$^2$.

EXAMPLE 8

| | | |
|---|---|---|
| Sodium styrene sulfonate | grams | 30 |
| Distilled water | cc. | 160 |
| Glycerylmonostearate | grams | .5 |
| Triton X-100 | do | .2 |
| Glycidylmethacrylate | do | 3.5 |
| Azoisobutyronitrile | do | 1 |

The reactants were mixed thoroughly together and maintained for 3 hours at 70° C. on water bath.

100 grams of above solution
100 grams Aston 108 (polyethylene glycol [600] diethylenetriamine condensate)
100 cc. water Cellophane was immersed in the above solution and dried at 165° F. in an oven. The resulting grafted film had a thickness of .0012" and ohmic resistance of 0.16 ohm x in.$^2$.

EXAMPLE 9

| | | |
|---|---|---|
| Glycidylmethacrylate | grams | 90 |
| Tetrahydrofurfuryl (THFA) alcohol | do | 90 |
| Water | cc. | 20 |
| Azoisobutyronitrile | grams | 5 |
| Triethanolamine (TEA) | do | 5 |

The reactants are mixed together and placed in a large test tube. A piece of cellophane is placed in this test tube so that it is completely submerged.

After evacuation, the test tube is placed on an oil bath and maintained at 110° C. for 15 minutes, after which time the cellophane is taken out and, washed with acetone and its ohmic resistance is measured in 44% KOH. Its value is .040 ohm after soaking for 24 hours. Next, the material is placed in an accelerated test to detect metal penetration through it, during cathodic deposition of zinc metal. It takes 40 hours for the metal to pierce through whereas non-treated cellophane takes between 2 and 2½ hours.

The attack of the material by anode material, which in this particular case may be silver oxide, in the case of cellophane by heavy deposition of silver metal, is prevented in the case of a separator according to the invention, there being no deposition in the grafted sample.

Whereas the invention has been described with reference to specific forms thereof, it will be understood that many changes and modifications may be made without departing from the spirit of this invention.

What is claimed is:

An alkaline electrochemical cell including a silver/silver-oxide positive electrode, a zinc oxide/zinc negative electrode, and at least one electrolyte-permeable interelectrode separator interposed between said electrodes, said separator consisting essentially of a sheet of cellophane film and an ethylenically unsaturated organic compound graft polymerized to said sheet and thereby chemically bonded thereto, said compound being present in an amount, on said sheet, sufficient to modify the interelectrode-separator characteristics of said material and being selected from the group which consists of glycidylmethacrylate, monomeric vinyl pyrrolidone, methacrylic acid, sodium styrene sulfonate, vinyl chloride, vinyl acetate, styrene, methyl styrene, acrylic acid, vinylidene chloride, acrylonitrile, methylmethacrylate, ethylmethacrylate, hydroxypropylmethacrylate and dimethylaminomethacrylate.

References Cited

UNITED STATES PATENTS

| | | | |
|---|---|---|---|
| 2,794,753 | 6/1957 | Duddy | 136—146 |
| 2,956,899 | 10/1960 | Cline. | |
| 2,965,697 | 12/1960 | Duddy | 136—146 |
| 3,008,920 | 11/1961 | Urchick | 204—158.1 X |
| 3,020,174 | 2/1962 | Natta et al. | 117—47 |
| 3,090,766 | 5/1963 | Stanton et al. | 204—158.1 X |
| 3,101,276 | 8/1963 | Hendricks | 204—158.1 X |
| 3,183,056 | 5/1965 | Pfeiffer et al. | 117—143 X |

WINSTON A. DOUGLAS, *Primary Examiner.*

JOHN H. MACK, *Examiner.*

D. L. WALTON, *Assistant Examiner.*